US011461605B2

(12) United States Patent
Casilli

(10) Patent No.: US 11,461,605 B2
(45) Date of Patent: Oct. 4, 2022

(54) SYSTEM AND METHOD FOR CONFIGURING AND MANAGING FIELD DEVICES OF A BUILDING

(71) Applicant: Siemens Industry, Inc., Alpharetta, GA (US)

(72) Inventor: Chris Casilli, Morriston, FL (US)

(73) Assignee: Siemens Industry, Inc., Alpharetta, GA (US)

( * ) Notice: Subject to any disclaimer, the term of this patent is extended or adjusted under 35 U.S.C. 154(b) by 324 days.

(21) Appl. No.: 16/370,255

(22) Filed: Mar. 29, 2019

(65) Prior Publication Data
US 2020/0311503 A1 Oct. 1, 2020

(51) Int. Cl.
*G06K 19/06* (2006.01)
*G06K 1/12* (2006.01)
*G05B 15/02* (2006.01)

(52) U.S. Cl.
CPC ....... *G06K 19/06037* (2013.01); *G06K 1/121* (2013.01); *G05B 15/02* (2013.01)

(58) Field of Classification Search
CPC .. G06K 19/06037; G06K 1/121; G05B 15/02; G06F 16/9554; H04L 12/2807; H04L 12/2816; H04L 12/28; H04L 12/281
See application file for complete search history.

(56) References Cited

U.S. PATENT DOCUMENTS

| 9,853,827 B1 | 12/2017 | Goodnow et al. |
| 10,129,046 B1 | 11/2018 | Casilli |
| 10,708,641 B2 * | 7/2020 | Eyer .................... G06K 7/1417 |

(Continued)

FOREIGN PATENT DOCUMENTS

| CN | 103843306 | 6/2014 |
| CN | 105981443 | 9/2016 |

(Continued)

OTHER PUBLICATIONS

Armstrong, Joe, "Making Reliable Distributed Systems in the Presence of Software Errors", Royal Institute of Technology, Stockholm, Sweden, Dec. 2003, 295 pages.

(Continued)

*Primary Examiner* — Sonji N Johnson

(57) ABSTRACT

There is described a building automation system comprising a communication component, a processor, and an output component. The communication component scans the building automation system to discover devices, and the processor generates a visual code for a particular field device. The visual code identifies a uniform resource locator directed to a virtual node hosting environment of the building automation system associated with the field device. The output component produces the visual code at a physical material for exhibition in proximity to the field device. Thereafter, the hosting environment receives a status request, associated with the uniform resource locator, for the field device from a mobile device. The hosting environment generates point information associated with the field device based on information collected from the field device in response to receiving the status request. The communication component sends the point information to the mobile device.

18 Claims, 10 Drawing Sheets

(56) References Cited

U.S. PATENT DOCUMENTS

| | | | |
|---|---|---|---|
| 2006/0129667 A1* | 6/2006 | Anderson | G06F 9/5077 |
| | | | 709/223 |
| 2010/0281387 A1 | 11/2010 | Holland | |
| 2012/0306620 A1* | 12/2012 | Karaffa | G05B 19/0423 |
| | | | 340/6.1 |
| 2013/0054033 A1 | 2/2013 | Casilli | |
| 2014/0173289 A1* | 6/2014 | Casilli | G06F 21/34 |
| | | | 713/185 |
| 2014/0337001 A1* | 11/2014 | Dayalan | G06F 30/20 |
| | | | 703/13 |
| 2018/0143599 A1 | 5/2018 | Hauville et al. | |
| 2020/0092126 A1* | 3/2020 | Ramanathan | H04L 12/281 |
| 2020/0320024 A1* | 10/2020 | McLaughlin | G05B 19/0423 |
| 2021/0089015 A1* | 3/2021 | Law | G05B 19/042 |

FOREIGN PATENT DOCUMENTS

| | | |
|---|---|---|
| CN | 206272758 | 6/2017 |
| WO | 2014/182621 | 11/2014 |
| WO | 2019/050708 | 3/2019 |

OTHER PUBLICATIONS

U.S. Appl. No. 16/251,382, filed Jan. 18, 2019, to Casilli, et al. titled "System and Method For Simulating System Operating Conditions", 27 pages.

PCT Search Report dated May 15, 2020, for PCT Application No. PCT/US2020/021660, 14 pages.

Chinese office action dated Jun. 23, 2022, for CN Application No. 202080025553.6, 14 pages.

\* cited by examiner

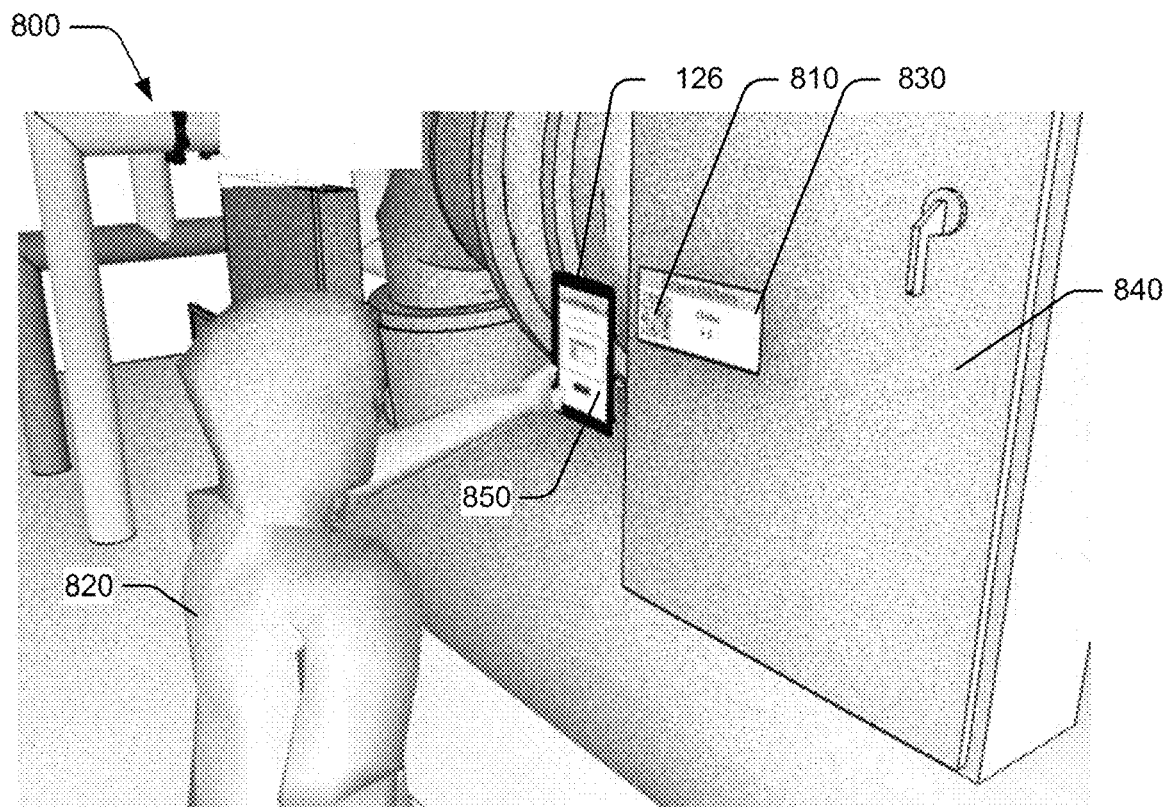
Fig. 8A
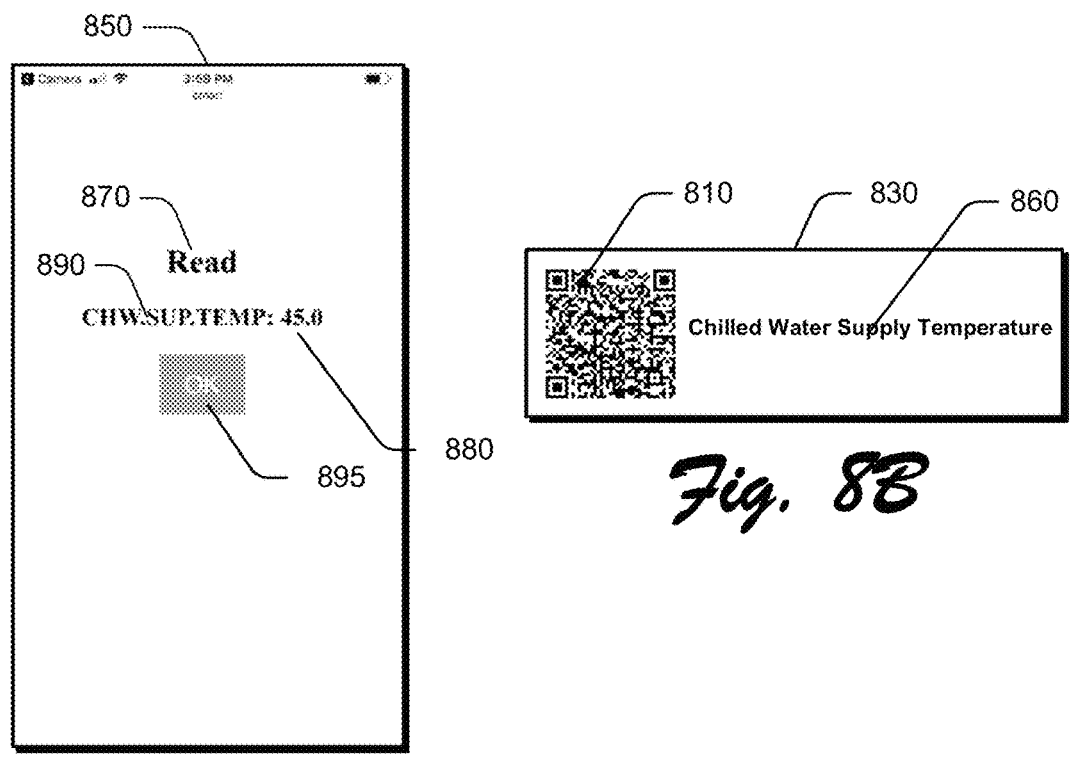
Fig. 8B
Fig. 8C

SYSTEM AND METHOD FOR CONFIGURING AND MANAGING FIELD DEVICES OF A BUILDING

FIELD OF THE INVENTION

This application relates to the field of building automation systems and, more particularly, to human interfaces for building networks.

BACKGROUND

Building automation systems encompass a wide variety of systems that aid in the monitoring and control of various aspects of building operation. Building automation systems (which may also be referred to herein as "building control systems") include security systems, fire safety systems, lighting systems, and heating, ventilation, and air conditioning ("HVAC") systems. Lighting systems and HVAC systems are sometimes referred to as "environmental control systems" because these systems control the environmental conditions within the building. A single facility may include multiple building automation systems (e.g., a security system, a fire system and an environmental control system). Multiple building automation systems may be arranged separately from one another or as a single system with a plurality of subsystems that are controlled by a common control station or server. The common control station or server may be contained within the building or remote from the building, depending upon the implementation. Traditionally, a certain level of technical training and understanding is needed to interact with these systems. Special dedicated applications are often needed to perform this interaction.

The elements of a building automation system may be widely dispersed throughout a facility or campus. For example, an HVAC system includes temperature sensors and ventilation damper controls as well as other elements that are located in virtually every area of a facility or campus. Similarly, a security system may have intrusion detection, motion sensors and alarm actuators dispersed throughout an entire building or campus. Likewise, fire safety systems include smoke alarms and pull stations dispersed throughout the facility or campus. The different areas of a building automation system may have different environmental settings based upon the use and personal likes of people in those areas, such as offices and conference rooms.

Building automation systems typically have one or more centralized control stations in which data from the system may be monitored, and in which various aspects of system operation may be controlled and/or monitored. The control station typically includes a computer or server having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

A typical building automation system has multiple, distributed field panels in communication with the central control station. Typically, if local displays are needed for data display purposes, a dedicated display panel would be installed. These field panels, dedicated display panels, and control stations are interconnected with communication and power wiring systems. While the central control station is generally used to make modifications and/or changes to one or more of the various components of the building automation system, a field panel may also be operative to allow certain modifications and/or changes to one or more parameters of the system. This typically includes parameters such as temperature and otherwise, set port changes, modify a control program, or the like.

The central control station and field panels are in communication with various field devices, otherwise known as "points". Field devices are typically in communication with field panels of building automation systems and are operative to measure, monitor, and/or control various building automation system parameters. Example field devices include lights, thermostats, damper actuators, alarms, HVAC devices, sprinkler systems, speakers, door locks, and numerous other field devices as will be recognized by those of skill in the art. The field devices receive control signals from the central control station and/or field panels. Accordingly, building automation systems are able to control various aspects of building operation by controlling the field devices.

Many building workers and occupants do not know how to use or operate a building automation system and have no desire to learn the required skills necessary to do so. Also, typically, only trained authorized personnel have access to Building Automation System. These worker and users still have a need for interaction with the building, its systems, and the resulting data set associated with them. Thus, the building automation system should have a cost-effective user interface that is intuitive for building workers and building occupants.

SUMMARY

Briefly described, there are described a building automation system, and associated method, that provides assistive maintenance of a building network. In particular, the system provides for configuring and managing field devices of a building. For configuring the field devices, the system generates visual codes, such as bar codes, associated with status or functions of the field devices that may be co-located with the field devices. An off-the-shelf mobile device may be used to read a particular visual code corresponding to a particular field device and display realtime information about the device's data without the need for dedicated building automation software or applications. For managing the field devices, the system may receive a request from a mobile device that has scanned a visual code. The system may provide information to the mobile device based on the request, and the system may also control one or more functions of the field device dependent on the request. Thus, there is provided an intuitive, cost-effective interface between the building automation system and various maintenance workers and building occupants of a building managed by the system.

One aspect of configuring field devices of a building is a building automation system for producing of a visual code for one or more field devices. A building automation system comprising a communication component, a processor, and an output component. The communication component is configured to scan the building automation system to discover a plurality of field devices. The processor is configured to generate a visual code for a particular field device of the plurality of field devices. The visual code identifies a uniform resource locator directed to a virtual node hosting environment of the building automation system associated with the particular field device. The output component is configured to produce the visual code at a physical material for exhibition in proximity to the particular field device.

Another aspect of configuring field devices of a building is a method of a building automation system for producing a visual code for one or more field devices. The building automation system is scanned to discover field devices. Next, a visual code for a particular field device of the plurality of field devices is generated. The visual code identifies a uniform resource locator that is directed to a virtual node hosting environment of the building automation system associated with the particular field device. Then, the visual code is provided at physical material for exhibition in proximity to the particular field device.

Yet another aspect of configuring field devices of a building is a building automation system for generating point information associated with one or more field devices. A processor is configured to generate a visual code for a field device of the building. The visual code identifies a uniform resource locator that is directed to a virtual node hosting environment of the building automation system associated with a particular field device. The virtual node hosting environment of the building automation system receives a status request for the particular field device from a mobile device. The status request is associated with the uniform resource locator identified by the visual code. The virtual node hosting environment further generates point information associated with the particular field device based on information collected from the particular field device in response to receiving the status request. A communication component is configured to send the point information associated with the particular field device to the mobile device.

Still another aspect of configuring field devices of a building is a method of a building automation system for generating point information associated with one or more field devices. A visual code for a field device of the building is generated at the building automation system. The visual code identifies a uniform resource locator that is directed to a virtual node hosting environment of the building automation system associated with the particular field device. Next, a status request for a particular field device is received at the virtual node hosting environment from a mobile device. The status request is associated with the uniform resource locator identified by the visual code. Then, the point information associated with the particular field device is generated at the virtual node hosting environment based on information collected from the particular field device in response to receiving the status request. Thereafter, the point information associated with the particular field device is sent to the mobile device.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIGS. 8A-8C depict example implementations of an operation of a mobile device in accordance with the techniques described herein.

DETAILED DESCRIPTION

To facilitate an understanding of embodiments, principles, and features of the present invention, they are explained hereinafter with reference to implementation in illustrative embodiments. In particular, they are described in the context of a building automation system for configuring and managing field devices of a building or building network. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

The building automation system provides an intuitive, cost-effective interface between central management systems and maintenance personnel for buildings, where "buildings" refer to individual buildings, building networks, and industrial plants. Many maintenance workers may not know how to operate a building automation system, and, without guidance or assistance, these maintenance workers may negatively impact building optimization and performance. The building automation system addresses these issues by providing a digital solution where visual codes are created and placed on the various pieces of equipment, i.e., field devices, throughout each and every building. These visual codes are encoded with information that the system will read and use to generate simple, but user friendly, interfaces at any imager-equipped mobile device. Thus, maintenance workers or others may use mobile devices, such as smart phones and tablets, to read various visual codes located throughout a facility at select interface points. For example, a central utility plant maintenance work may read and command various points and systems, the general public may read publicly available information, researchers may access energy data and building performance metrics, and energy managers may review energy data and occupant levels.

Figure 1:
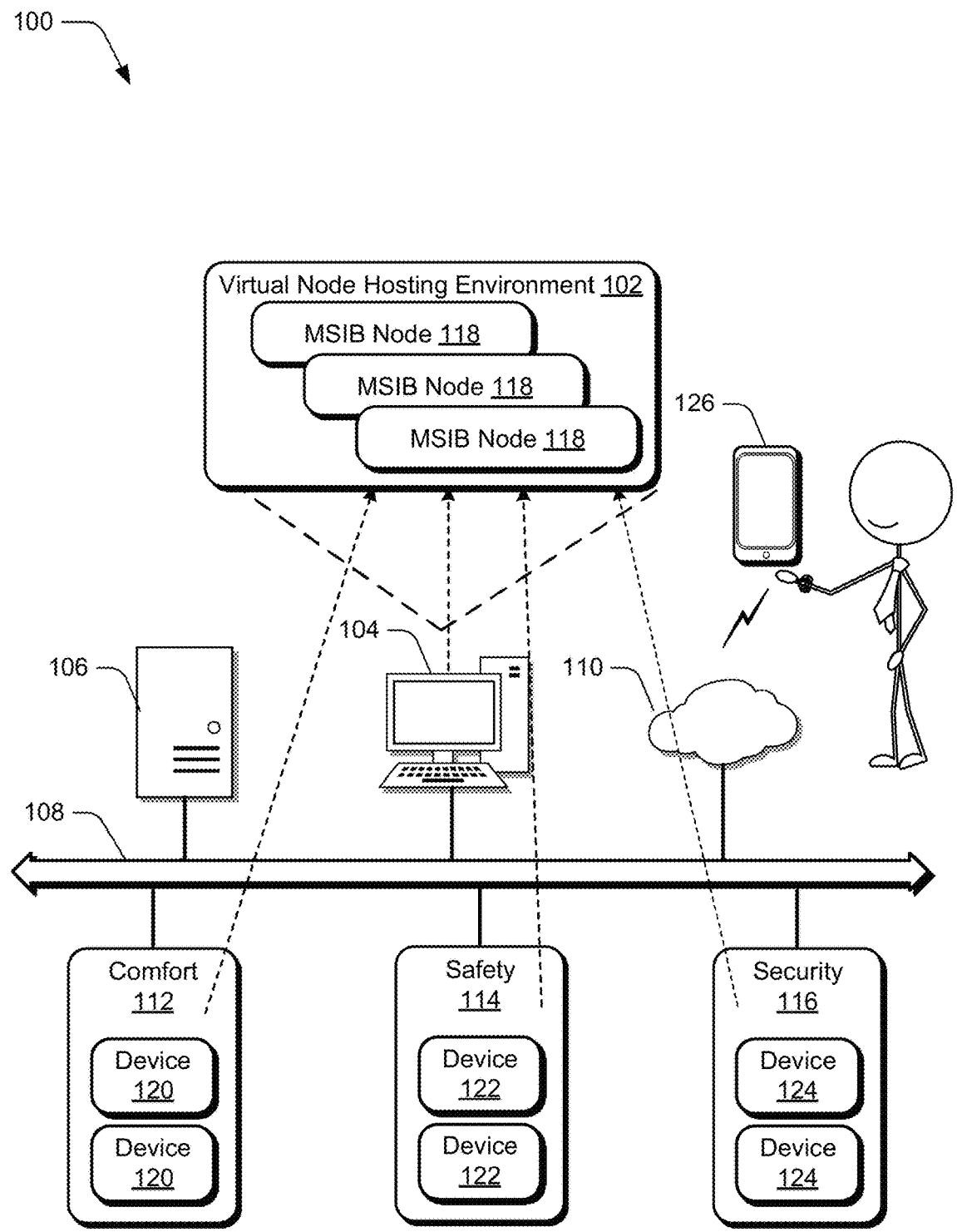
FIG. 1 is an illustration of an environment in an example implementation, including a building automation system and a mobile device communicating with the system, that is operable to employ techniques described herein.

Referring to FIG. 1, there is illustrated an example building automation system 100 for implementing a virtual node hosting environment 102 in a management device 104, which is a component of the building automation system. The management device 104 may communicate with various devices directly, such as through a network communication bus 108, or via an internal or external network interconnected with the network communication bus, such as a communication network 110.

As shown in FIG. 1, the building automation system 100 may be an environmental control system configured to control one or more environmental parameters for one or more building environments, such as temperature, humidity, ventilation, lighting, fire safety, security, and the like. The building automation system 100 may comprise one or more management devices, such as a workstation and/or server, that allows the setting and/or changing of various controls of the control panels and field devices of the system. While a brief description of the building automation system 100 is provided below, it is to be understood that the building automation system 100 described herein is only one example of a particular form or configuration for the building automation system and the system may be implemented in any other suitable manner without departing from the scope of this disclosure.

For the embodiment represented by FIG. 1, the building automation system 100 provides connectivity to subsystems for various environmental parameters such as components of comfort sub-systems 112, safety sub-systems 114, and security sub-systems 116. For example, comfort sub-systems 112 may include various devices 120 for monitoring and controlling heating, cooling, ventilation, and lighting of areas within a building or group of buildings. Examples of comfort devices include, but are not limited to, stations, field panels, field controllers, field devices, light fixtures, and the like. Similarly, safety sub-systems 114 may include various devices 122 for monitoring and controlling fire protection for areas within a building or a group of buildings. Examples of safety devices include, but are not limited to, controllers, control panels, detectors, alarm systems, video surveillance cameras, and the like. Further, security sub-systems 116 may include various devices 124 for monitoring and controlling activities within a building or group of buildings. Examples of security devices include, but are not limited to, video surveillance cameras, motion detectors, portal controls, and the like. Some devices may communicate through the network communication bus 108, and some devices may communicate directly or wirelessly with other devices. It is to be understood that the system (100 may comprise any suitable number of any of components 120-124 based on a particular configuration for each building or group of buildings.

FIG. 1 also represents one or more mobile devices 126 that may communicate with the building automation system 100. The mobile devices are external and generally remote from the management device 104 of the system 100. The mobile device 126 may utilize any form of data connectivity, whether wired or wireless, to communicate with the various devices of the building automation system 100. For example, each mobile device 126 may communicate with the management device 104, particularly the virtual node hosting environment 102 of the management device, via the network communication bus 108 and/or communication network 110 of the system 100. Each mobile device 126 may also communicate with one or more field devices, represented by devices 120, 122, 124, via a direct link in proximity to each field device. For example, each mobile device 126 may capture a visual code position at, or in proximity to, a particular field device via an imager of the mobile device.

Figure 2A:
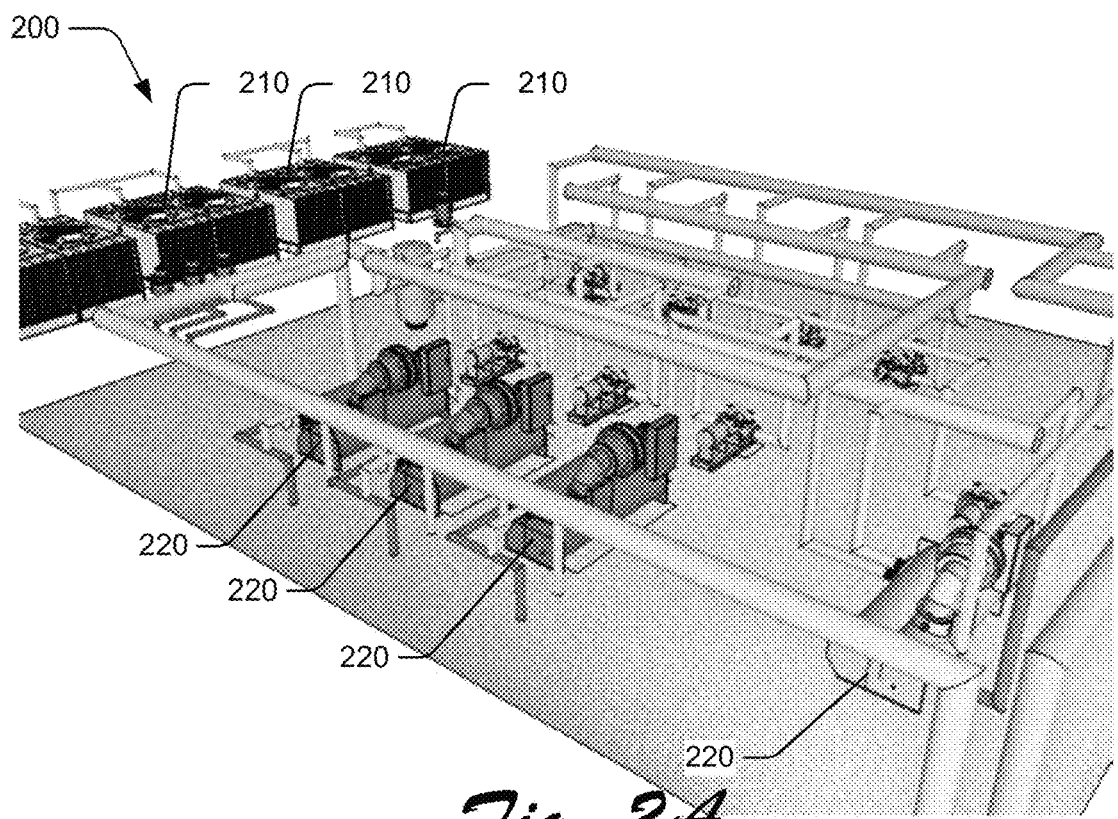
FIGS. 2A and 2B depict example implementations of select areas of a building that is operable to employ techniques described herein.

FIG. 2A represents examples of field devices various field devices of a building, and any select area 200 of the building, may include that contribute to the operation of the building automation system 100. Any reference to a "building", as described herein, is to be understood to include a building, building network, plant, and/or multiples of the same. Examples of field devices include, and are not limited to, devices of comfort sub-systems 112 such as air flow devices 210 and fluid flow devices 220. For some embodiments, the air flow devices 210 may include fans, dampers, motors, and variable speed drives that facilitate the flow and control of air throughout the select area 200 and/or other parts of an associated building. These air flow devices 210 may be monitored and controlled by components of the building automation system 100, such as thermostats, sensors, actuators, meters, control units, and control panels. For some embodiments, the fluid flow device 220 may include pumps, valves, and variable speed drives that facilitate the flow and control of fluid throughout the select area 200 and/or other parts of the associated building. These fluid flow devices 220 may be monitored and controlled by components of the building automation system 100, such as sensors, actuators, meters, control units, and control panels.

Figure 2B:
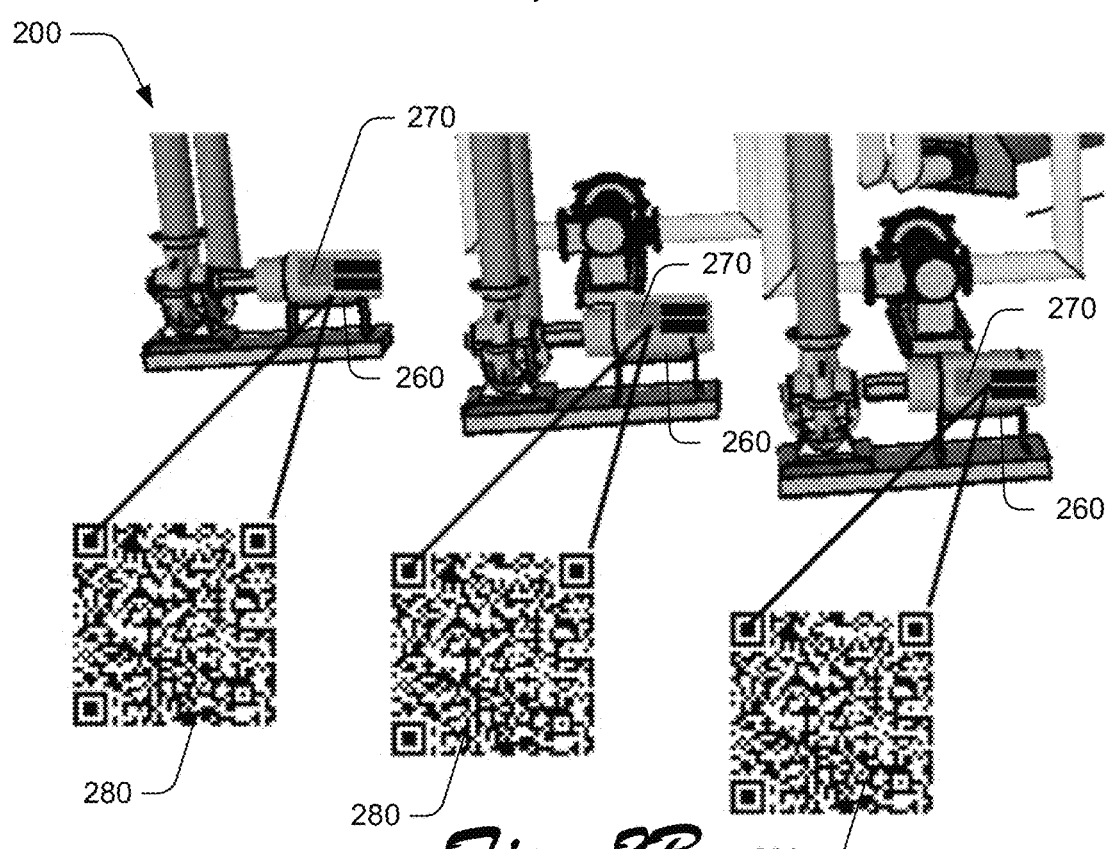

FIG. 2B focuses on specific field devices 260 located in the select area 200 of the building. Each particular field device 260 includes one or more visual codes 270 exhibited in proximity of the particular field device. Each visual code 270 may be integrated at, or attached to, an outer surface of the particular field device. For example, the visual code 270 may be imprinted or embossed at the outer surface, or the visual code may be printed at a front side of a physical material having an adhesive at a back side for attachment to the outer surface. An output component, such as a printer, may be configured to produce the visual code at the physical material for exhibition in proximity to the particular field device.

In FIG. 2B, the visual codes 270 of the specific field devices 260 are enlarged and shown as enlarged visual codes 280. The visual code 270 includes visually coded information that identifies a uniform resource locator directed to a virtual node hosting environment of the building automation system 100 associated with the particular field device. The visual code 270 may include other information such as data (other than the uniform resource locator), finder pattern, separator, timing pattern, alignment pattern, format information, error correction, and/or remainder bits. The visual code 270 may be a one-dimensional barcode type, a two-dimensional barcode type, or any other type of visually coded information. Examples of one-dimensional barcode types of visual codes include, and are not limited to, UPC code, EAN code, Code 39, Code 128, ITF, Code 93, Codabar, GS1 DataBar, and MSI Plessey. Examples of two-dimensional barcode types of visual codes include, and are not limited to, QR code, Datamatrix code, PDF417, and Aztec. The enlarged visual codes 280 in FIG. 2B are shown, by example, as QR codes.

Figure 3:
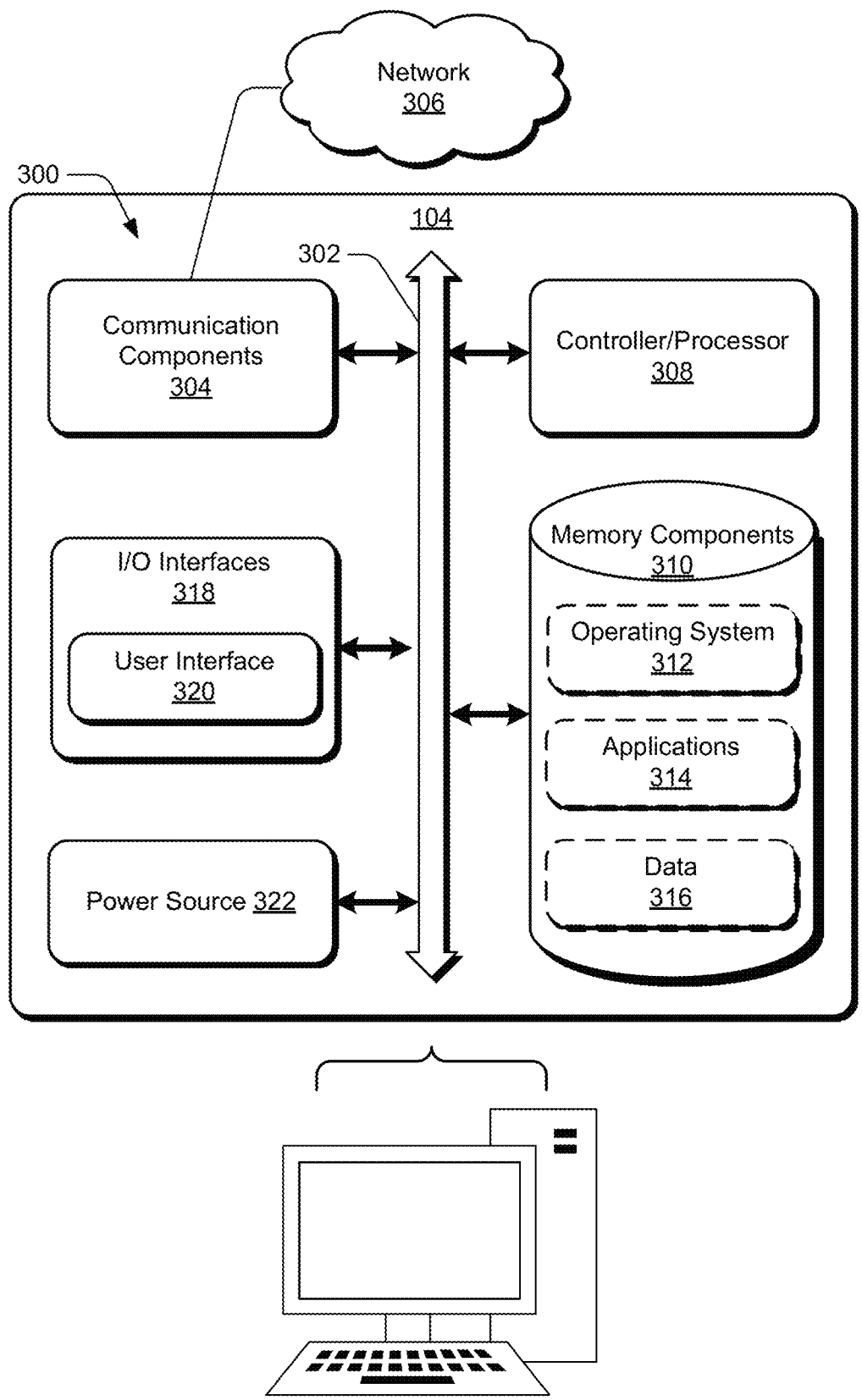
FIG. 3 depicts an example implementation of various possible components of the management device of FIG. 1.

Referring to FIG. 3, there is shown an example representation of the various device components 300 of the management device 104 of the building automation system 100. The management device 104 may be a server, a workstation, a remote device, or other type of device for management and control of one or more aspects of the building automation system 100. The device components 300 of the management device 104 include a device communication bus 302 for interconnecting, addressing, controlling, and/or transferring data among the various device components. The device components 300 comprise one or more communication components 304 communicate with other entities via a wired or wireless network 306, one or more controllers or processors 308, and one or more memory components 310. The communication component 304 of the example device components 300 may utilize wireless technology for communication, such as, but are not limited to, satellite-based and cellular-based communications and their variants as well as wireless local area network (WLAN) communication and their variants, such as infrastructure, peer-to-peer, ad hoc, bridge, and wireless distribution-based communications Examples of WLAN communications include, but are not limited to. IEEE 802.11 (Wi-Fi), IEEE 802.16 (WiMAX), Bluetooth, BLE, and ZigBee. Wireless communications may further include other forms of communication such as microwave or infrared technology (IR). The communication component 304 of the example device components 300 may also utilize, in addition to or in the alternative, wired technology for communication, such as transmission of data over a physical conduit, e.g., an electrical cable or optical fiber cable.

The processor 308 may execute code and process data received other components of the device components 300, such as information received at the communication component 304 or stored at the memory component 310. The code associated with the building automation system 100 and stored by the memory component 310 may include, but is not limited to, operating systems, applications, modules, drivers, and the like. An operating system 312 includes executable code that controls basic functions of the management device 104, such as interactions among the various components of the device components 300, communication with external devices via the communication component 304, and storage and retrieval of code and data to and from the memory component 310. Each application 314 includes executable code to provide specific functionality for the processor 308 and/or remainder of the management device 104. Examples of applications 314 executable by the processor 308 and stored by the memory component 310 include, but are not limited to, building automation system applications, such as applications supporting virtual node hosting environments. Data 316 is information that may be referenced and/or manipulated by an operating system or application for performing functions of the management device 104. Examples of data 316 associated with the building automation system 100 and stored by the memory component 310 may include, but are not limited to, configuration files associated with one or more virtual nodes, data files associated with the configuration files, and the like.

The device components 300 of each management device 104 may further comprise one or more input and/or output components (I/O interfaces) 318. The I/O interfaces 318 of the device components 300 may include a variety of video, audio, and/or mechanical components. The I/O interfaces 318 of each management device may comprise a user interface 320 for interaction with a user of the management device. The user interface 320 may include a combination of hardware and software to provide a user with a desired user experience. For example, the user interface 320 may include one or more input components to allow the user to enter information and one or more output components to provide information to the user. Although the user interface 320 may include all input components and all output components of the I/O interface 318, the user interface may also be directed to a specific subset of input components and/or output components.

The device components 300 may further comprise a power source 322 such as a power supply or a portable battery, for providing power to the other device components 300 of each management device 104 of the building management system 100.

It is to be understood that FIG. 2 is provided for illustrative purposes only to represent examples of the device components 300 of a management device 104 and is not intended to be a complete diagram of the various components that may be utilized by the device. Therefore, management device 104 may include various other components not shown in FIG. 3, may include a combination of two or more components, or a division of a particular component into two or more separate components, and still be within the scope of the present invention.

Figure 4:
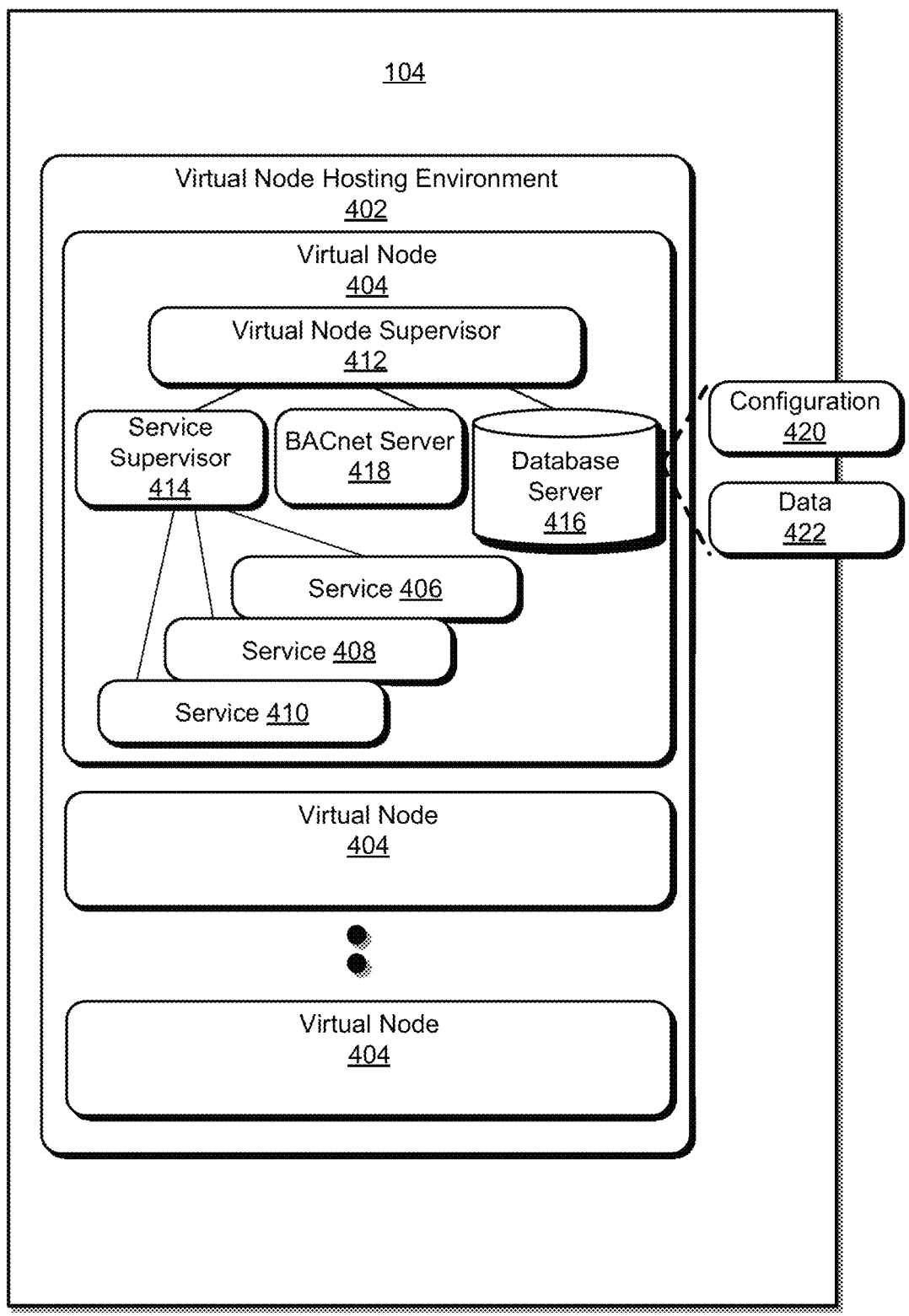
FIG. 4 depicts an example implementation of a virtual node hosting environment of the building automation system of FIG. 1.

Referring to FIG. 4, there is shown a management device 104 comprising a virtual node hosting environment 402 that operates in the background to continuously process services for one or more virtual nodes 404. The management device 104 may also include a user interface 220 as shown in FIG. 2, such as a web browser, that may provide for configuration and maintenance of the virtual node hosting environment 402 and the virtual nodes operated in the hosting environment. The virtual nodes 404 may be digital representations of managed devices, such as field devices 112, 114, 116, as well as the points associated with the managed devices.

The virtual node hosting environment 402, and any components thereof, may scan the building automation system 100 for field devices 112, 114, 116 to create data files which are used to configure and manage the field devices of the building automation system 100. The data files may include, but are not limited to, points associated with the building automation system and their corresponding values associated with system operation conditions. In particular, the virtual node hosting environment 402 may send out a discovery message throughout the building automation system 100 and create an initial list of field devices that respond. The hosting environment 402 may then obtain an object list of each field device and read the properties of each supported object of each field device. The learned information may be collected in a data file and stored in memory, one for each device or multiple devices. When scanning is complete, a summary file with all of the field devices may be created as well. The scanning may be limited to specific devices or include the entire network. The various object types implemented in the building automation system and that correspond to the discovered devices include, but are not limited to, an analog type, a binary type, a multi-state type, and a pulse converter type.

As shown in FIG. 4, each virtual node 404 of a virtual node hosting environment 402 may manage one or more services 406, 408, 410 to facilitate communication of data with the various devices of the building automation system 100, communication of data with external devices (such as mobile device 126), and processing and/or manipulating data for the various devices. In this manner, the building automation system may scale as needed to digitally represent the various services provided by the physical world in a building, campus, or even a large enterprise. An example of a service 406, 408, 410 is a maintenance assist service as described herein. Other examples of a service 406, 408, 410 include, but are not limited to, services for implementing specific protocols to access equipment, panels and points, collect periodic data from equipment, panels and points, monitor operational conditions of equipment, panels and points, and the like. Thus, each virtual node 404 of the virtual node hosting environment 402 may run and manage a maintenance assist service. For example, a second system consistent with the maintenance assist service as described herein may be managed at a second virtual node, concurrently with a first system managed at a first virtual node, in which the systems and virtual nodes may manage different points of the building automation system. For this example, each system and virtual node may be associated with a different data file, stored with or as part of data file 316.

Each virtual node 404 may include a virtual node supervisor 412 to monitor the operations of the virtual node and oversee the activity of multiple servers 414, 416, 418 managing these operations. The virtual node supervisor 412 also enables communication with other components of the virtual node hosting environment 402 as well as the components of other virtual nodes. The virtual node supervisor 412 may manage a service supervisor server 414 to supervise the services 406, 408, 410 of the virtual node 404. If a service ceases to operate properly or dies, the service supervisor server 414 may spawn a replacement service or restart the service and clean-up resources related to the service. The virtual node supervisor may also manage a database server 416 to provide data storage for the servers and services for the duration of the existence of the virtual node. Information that may be stored by the database service 416 include, but are not limited to, configuration files 420 and data files 422 associated with one or more components of the virtual node 404. The virtual node supervisor 412 may further manage a network server, such as a BACnet server 418, to provide data communications for various components throughout, and external to, the building automation system 100. For example, the BACnet server 418 shown in FIG. 4 may provide communications between a maintenance assist service of the virtual node 404 and a mobile device 126.

Figure 5:
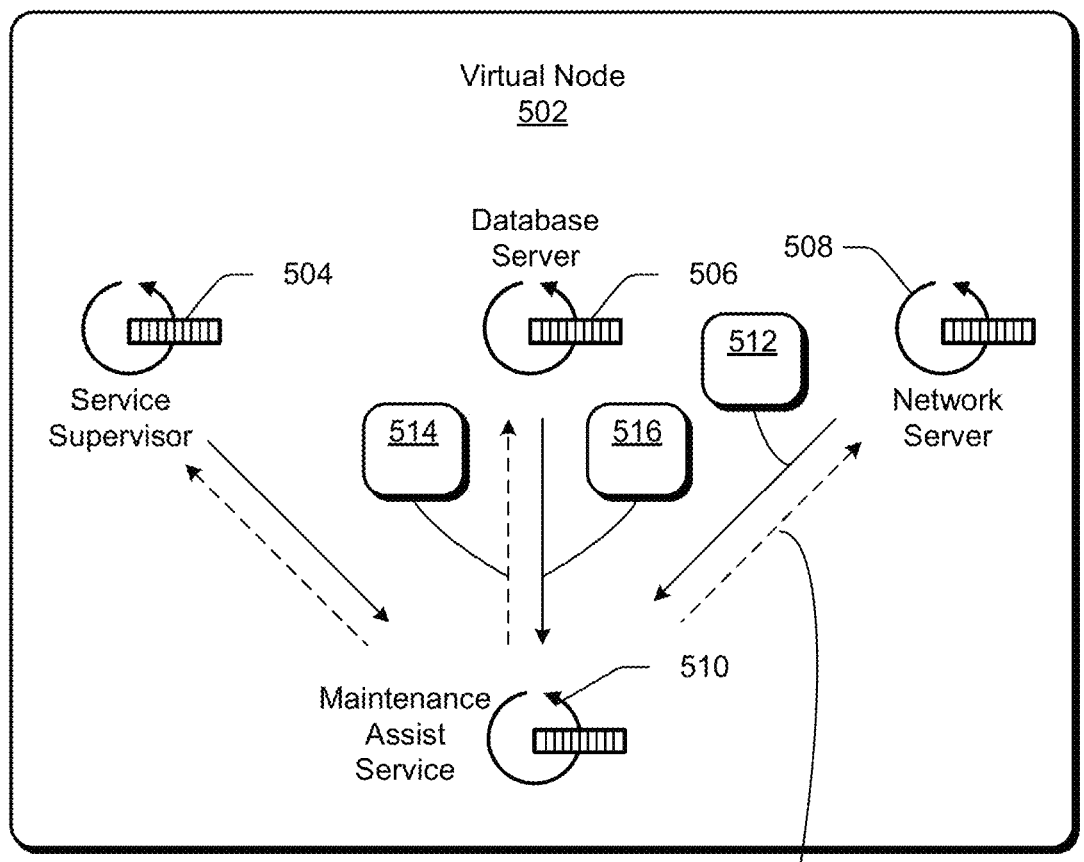
FIG. 5 depicts an example implementation of a virtual node of the virtual node hosting environment of FIG. 4.
Figure 5:
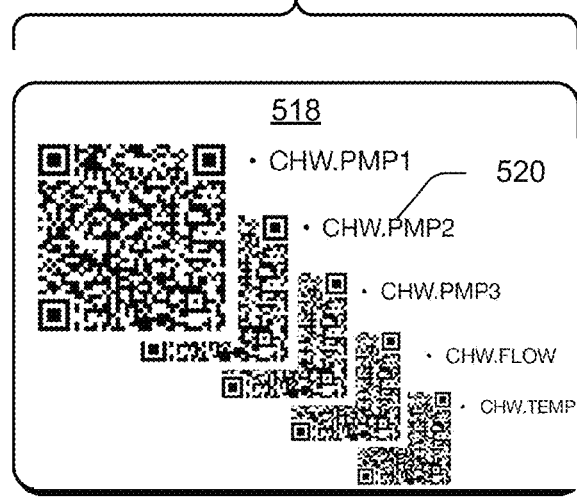

FIG. 5 represents example operational components 500 of a virtual node 502 for management and operation of the maintenance assist service, which may be implemented for the components of FIG. 4, as managed by virtual node 502 (e.g., such as service 406, 408, and 410). The virtual node 502 includes a service supervisor server 504, a database server 506, and a network server 508, similar to the representation of the building automation system 400 of FIG. 4. The service supervisor server 504 generally manages the services of the virtual node 502, the database server 506 provides data storage for the servers and services of the virtual node, and the network server 508 provides data communications for various components throughout, and external to, the building automation system 100. For example, as described above, the network server 508 may provide communications between the maintenance assist service of the virtual node 502 and a mobile device 126.

The virtual node 502 includes a maintenance assist service 510 which may communicate directly or indirectly with the service supervisor server 504, the database server 506, and the network server 508. The maintenance assist service 510 may generate visual codes for field devices discovered by the building automation system in response to receiving instructions 512 from the network service 508. The maintenance assist service 510 may include, in the visual codes, a uniform resource locator that is directed to one or more virtual node hosting environments 402 of the building automation system associated with the field devices. The instruction 512 may be received from a user device internal or external to the building automation system. For example, the instructions 512 may be received by the maintenance assist service 510 from a user interface 320 of a management device 104. The maintenance assist service 510 may then send an information request 514 to the database server 506 for information results 516 associated with the field device. Thereafter, the maintenance assist service 510 may generate the visual codes based on the information results 516 and provide the visual codes 518 to the network server 508. The network server 508 may forward the visual codes to an output component, such as a printer internal or external to the building automation system 100, configured to produce the codes at a physical material for exhibition in proximity to the field devices.

The information results 516, utilized by the maintenance assist service 510 to generate the visual codes 518, may include scan results and maintenance assist data. The scan results may include data about the field devices discovered based on a scan of the building automation system. The maintenance assist data may include information about the type of field devices and/or the types of field device functions that may be configured and managed for a building or building network. The maintenance assist service 510 may generate a visual code 518 for a particular field device by identifying a uniform resource locator directed to the virtual node hosting environment of the building automation system associated with the particular field device, identifying a point reference of the building automation system associated with the particular field device, and encode the uniform resource locator and the point reference in the visual code. The maintenance assist service 510 may identify and encode other information in the visual code 518, such as a field device function associated with the particular field device to be activated in response to a request from the mobile device 126. The maintenance assist service 510 may further generate a textual code 520 corresponding to each visual code 518 to further identify the particular field device and/or field device function of the particular field device.

Figure 6:
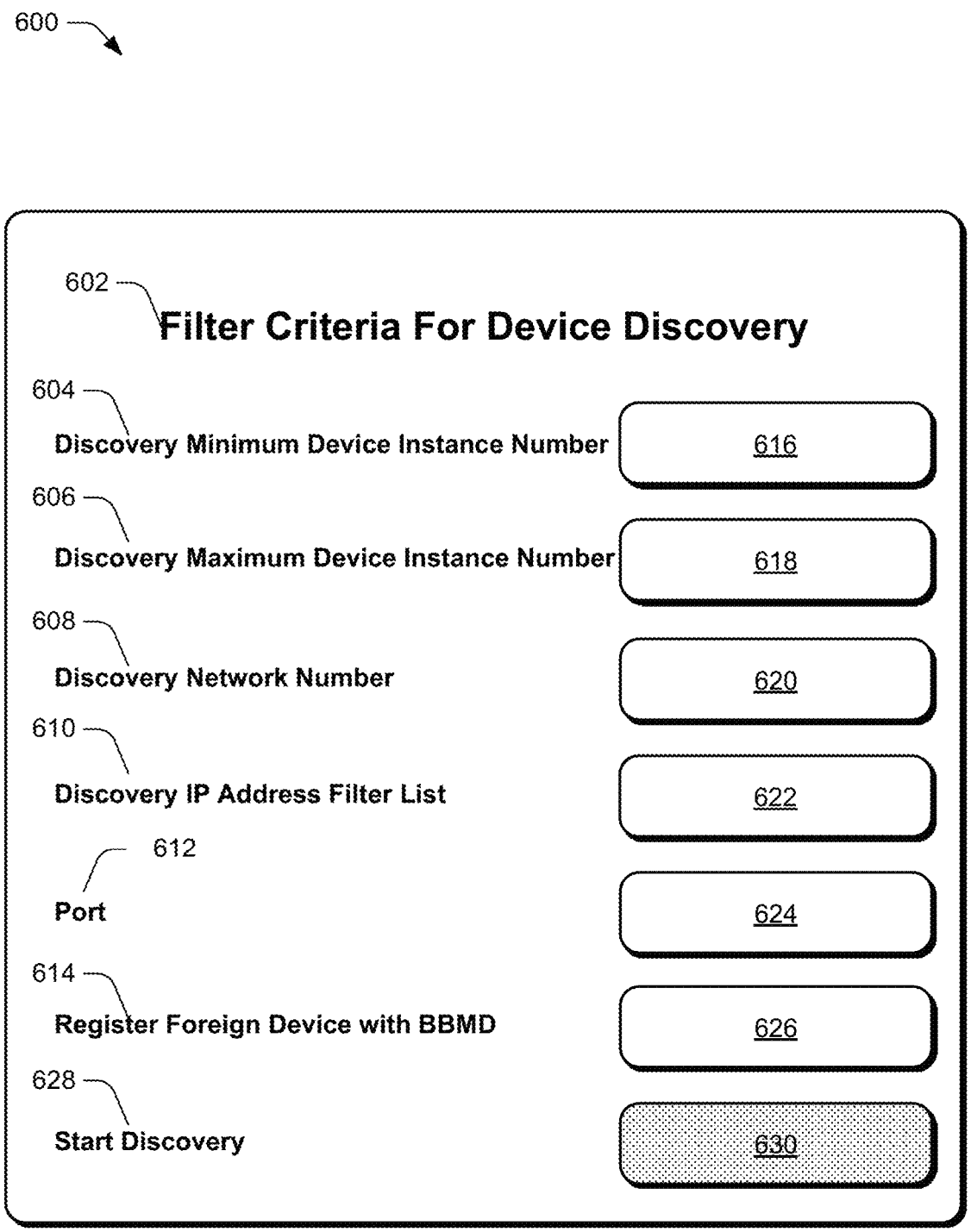
FIG. 6 depicts an example implementation of a data entry screen of the management device of FIG. 1.

Referring to FIG. 6, there is shown an example implementation of a data entry screen 600 of the management device 140, which may be utilized and controlled by the maintenance assist service 510 of FIG. 5. The maintenance assist service 510 may generate the visual codes based on the information results 516 which may include scan results and maintenance assist data. The maintenance assist service 510 may identify the field devices and/or field device functions that may benefit from configuration and management by using the maintenance assist data to filter the scan results. Thus, visual codes 518 may be generated for just the elements of the scan results that correspond with an element of the maintenance assist data. The maintenance assist service 510 may filter the scan results using the data entry screen 600 shown in FIG. 6 in addition to, or the alternative to, filtering based on the maintenance assist data.

The data entry screen 600 represents a filter criteria for the scan results that may be specified by a user interface 320 of the management device 104 or other device of the building automation system 100. The data entry screen 600 may include header 602, one or more criteria types 604-614, and data entry fields 616-626 corresponding to the criteria types. Examples of criteria types include, and are not limited to, a minimum instance number for discovery devices 604, a maximum instance number for discover devices 606, one or more network numbers associated with the discovery devices 608, one or more complete or partial IP addresses to filter the list of discover devices 610, one or more port numbers associated with the discover devices 624, and inter-network information 626 such as registration of a "foreign device" with a building management network, such as a BACnet/IP Broadcast Management Device. The data entry screen 600 may further include an activation button 628 to initiate filtering or further discover of field devices and/or field device functions.

For other embodiments, the maintenance assist service 510 may scan a building automation system 100 during discovery for equipment defined by the maintenance assist data of the information results 516 instead of filtering the scan results using the maintenance assist data as described above.

Figure 7:
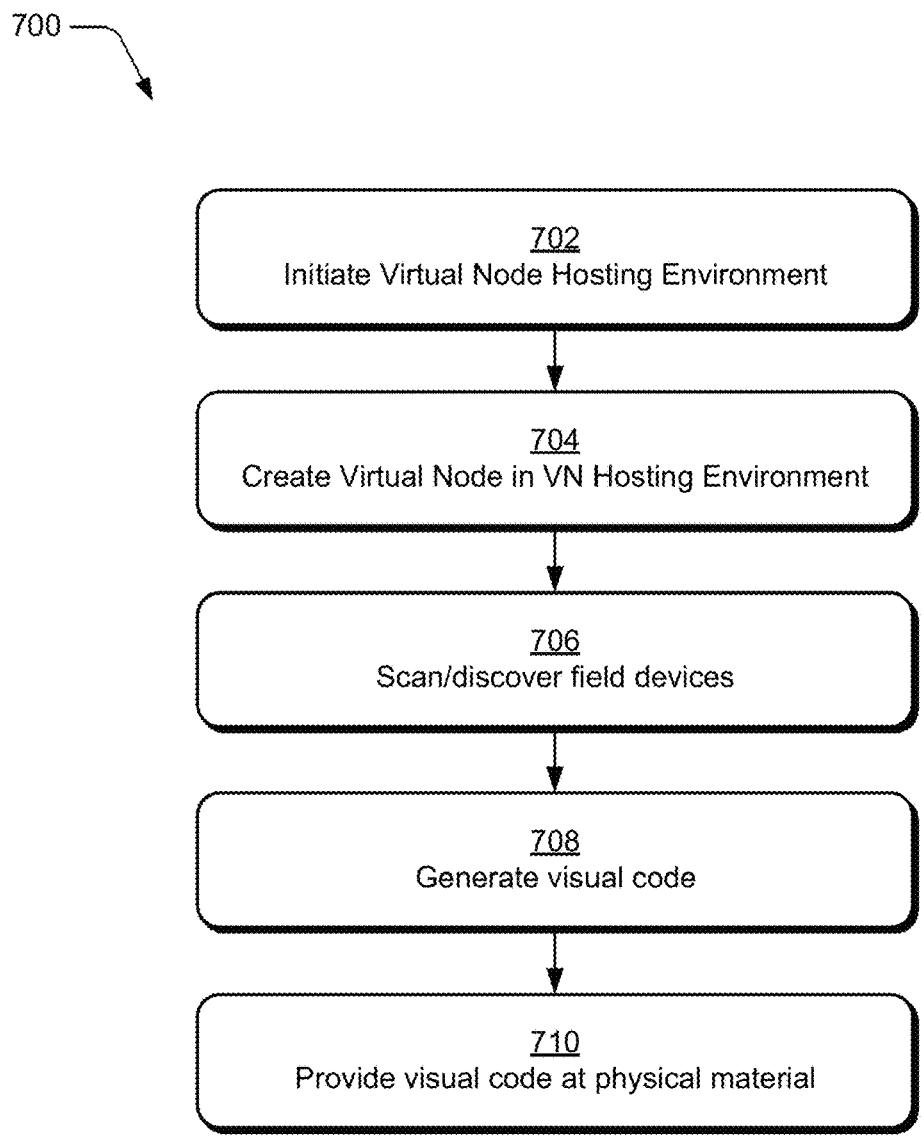
FIG. 7 depicts an example implementation of the procedure for configuring field devices in accordance with the techniques described herein.

FIG. 7 represents an example implementation of the procedure 700 for configuring field devices in which discovery of field device information and generation of visual codes is automated by the virtual node hosting environment 402 of the building automation system 100. The virtual node hosting environment 402 has the ability to scan the building automation system 100 and discover the various systems, devices, and associated points. The virtual node hosting environment 402 may generate automatically visual codes, such as image files for the various bar codes, with their associated encodings in response to completion of the discovery function. The visual codes may be exhibited on paper, placards, or some other form of physical material.

For the procedure 700 of FIG. 7, the management device 104 may initiate a virtual node hosting environment 402 by utilizing the processor 308 to create the environment in memory 310 at step 702. Next, the management device 104 may create one or more virtual nodes 404 in the virtual node hosting environment 402 at step 704. The virtual node hosting environment 402, and any components thereof, may scan the building automation system 100 for field devices 112, 114, 116 to create data files which are used to configure and manage the field devices. The data files may include, but are not limited to, points associated with the building automation system and their corresponding values associated with system operation conditions.

The management device 104 may generate visual codes for the discovered field devices in response to discovering the field devices or in response to receiving instructions from the user interface 320 of a device internal or external to the building automation system, such as the management device. The management device 104 may generate the visual codes, at step 708, based on the information gathered from discovering the field devices. In generating the visual codes, the management device 104 include a uniform resource locator that is directed to one or more virtual node hosting environments 402 of the building automation system associated with the field devices. The management device 104 may provide the visual codes to an output component, such as a printer internal or external to the building automation system 100, configured to produce the codes at a physical material for exhibition in proximity to the field devices at step 710. An example of an output component is an ink-based printer capable of engaging printable material.

FIGS. 8A-8C represent an example implementation of an operation of a mobile device 126 working in conjunction with the building automation system 100. As shown in FIG. 8A, a mobile device 126 may include a sensor for remote reading of a visual code 810 in the field, i.e., at a building. For example, a maintenance worker 820 may desire the acquisition of a sensor value while in a central plant so the maintenance worker may scan a visual code 810 exhibited at a physical material 830 in proximity to the sensor. The mobile device 126 acquires the visual code 810 using an imager of the mobile device. The mobile device 126 extracts from the visual code 810 a uniform resource locator that is directed to one or more virtual node hosting environments 402 of the building automation system 100 associated with the field devices 840. The mobile device 126 communicates information based on the visual code 810 automatically via a communication component of the mobile device to the virtual node hosting environment 402 based on the extracted uniform resource locator. The information of the visual code 810 is processed by the virtual node hosting environment 402. In this matter, the information encoded in the visual code 810 enables the virtual node hosting environment 402 to provide the requested sensor value to the mobile device 126.

FIG. 8B represents an example physical material 830. The physical material 830 may include the visual code 810 and, optionally, the physical material may further include a textual description 860 to facilitate the ability of a user of the mobile device 126 to identify the visual code.

FIG. 8C represents an example point information 850 provided at the mobile device 126. The point information 850 includes data associated with the building automation system that may be monitored or controlled in realtime by one or more field devices. The point information 850 may be sent via a communication component 304 of the management device 104, and the point information may be associated with the particular field device in proximity to the physical material corresponding visual code 810. The point information 850 may include a request mode 870, a maintenance assist result 880, and a textual code 890. The request mode 870 is associated with the visual code 810. Examples of the request mode 870 include, and is not limited to, a read only mode and a read/command mode. The maintenance assist result 880 may be provided by the virtual node hosting environment 402 in response to receiving information about the visual code 810, and the textual code 890 may be associated with the visual code or the result provided by the virtual node hosting environment. For the example of FIGS. 8B and 8C, in response to the visual code 810 shown, the maintenance assist result 880 may be information generated (e.g., 45.0 degrees) in association with the current temperature of a chilled water supply of the particular field device, and the textual code 890 of the point information 850 corresponds to the textual description 860 of the physical material 830. The point information 850 may further include a selection button 195 to acknowledge receipt of the point information by a user of the mobile device 126.

Figure 9A:
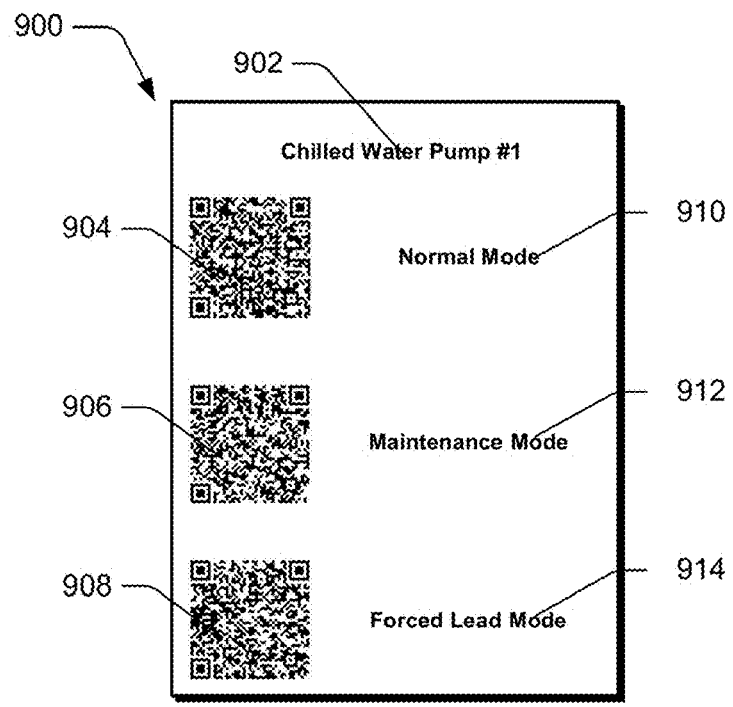
FIGS. 9A and 9B depict example implementations of another operation of the mobile device in accordance with the techniques described herein.

FIG. 9A represents another example physical material 900. In contrast to the physical material 800 of FIG. 8B which activates a single read only mode, the physical material 900 of FIG. 9A provides an opportunity to select among multiple read/command modes. The physical material 900 may include a header 902 identifying the particular field device, multiple visual codes 904-908 associated with functions of the particular field device, and, optionally, textual descriptions 910-914 corresponding to the functions of the particular field device to facilitate the ability of a user of the mobile device 126 to identify the visual codes. The physical material 900 may be positioned in proximity to a particular field device managed by the building automation system 100 such that the mobile device 126 may be used to activate a particular mode among multiple modes of the field device. For example, the mobile device 126 may select among a first, second and third visual code 904-908 of a physical material corresponding to a chilled water pump, as labeled by the textual descriptions 910-914 for a normal mode, a maintenance mode, and a forced service mode. A maintenance person 820 may use the mobile device 126 to activate a particular mode of the chilled water pump, such as the normal, maintenance, or forced service modes 910-914 by capturing the corresponding visual code 904-908 and sending a request corresponding to the visual code to the virtual node hosting environment 402.

Figure 9B:
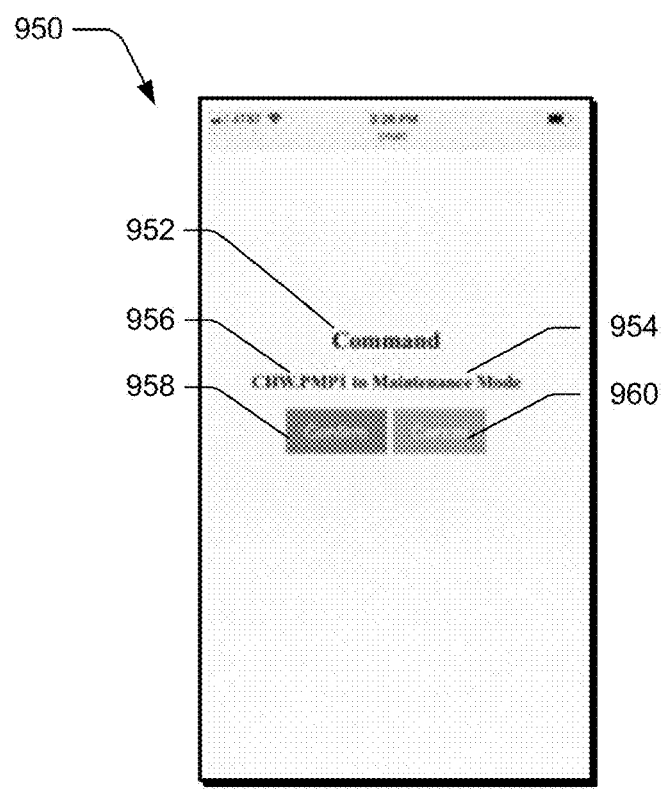

FIG. 9B represents another example point information 950 provided at the mobile device 126. Similar to FIG. 9A, the point information 950 of the mobile device 126 shown by FIG. 9B is different from the point information 850 shown by FIG. 8C. The point information 950 includes data associated with the building automation system that may be monitored or controlled in realtime by one or more field devices. In particular, the point information 950 may include a request mode 952, a maintenance assist result 954, and a textual code 956. The request mode 952 is associated with the visual codes 904-908. Examples of the request mode 952 include, and is not limited to, a read only mode and a read/command mode, and the request mode shown in FIG. 9B is a read/command mode. The maintenance assist result 954 may be provided by the virtual node hosting environment 402 in response to receiving information about a selected visual code, such as a second visual code 906, and the textual code 912 may be associated with the selected visual code or the result provided by the virtual node hosting environment. For the example of FIGS. 9A and 9B, in response to the visual code 906 shown, the maintenance assist result 954 may be information generated in association with a function of the maintenance mode of the particular field device, and the textual code 956 of the point information 950 corresponds to the textual description 912 of the physical material 900. The function of the particular field device may be executed automatically or in response to a message from the mobile device 126. If responding to the message of the mobile device 126, then the point information 950 may further include one or more confirmation buttons 958, 960 (such as "Confirm" and "Cancel") to determine whether to proceed with the function or cancel the request for the function from the mobile device 126.

As described above, the building automation system 100 has the ability to perform at least two different modes of operation: (1) read only mode, and (2) read/command mode. In read only mode, the mobile device 126 may request and acquire point information such as present value and status, and the system is protected from being affected by the mobile device. Generally, the point information includes data associated with the building automation system that may be monitored or controlled in realtime by one or more field devices. The mobile device 126 may only obtain information from the building automation system 100 and, as such, there is minimal concern about which device is accessing the system. For this reason, for some embodiments, the read only mode may be available to a wide group of devices, perhaps even devices located in areas of the building that are accessible by the general public, such as lobbies, waiting rooms, etc. These public facing visual codes provide a way to convey information to the public on-demand, if desired.

For some embodiments, the visual code 280 (such as visual codes 518, 810, 904-908) may include a first portion that is unencrypted and a second portion that is encrypted. For example, an unencrypted portion of the visual code may include the uniform resource locator that points to the virtual node hosting environment 402 of the management device 104, and the encrypted portion may include actionable information associated with controlling a particular field device. The actionable information may include point data corresponding to the particular field device to enable the virtual node hosting environment 402 of the building automation system 100 to communicate with the particular field device. The actionable information may include command information corresponding to the particular field device to enable the virtual node hosting environment 402 of the building automation system 100 to cause an action to be performed by the particular field device.

Actionable information may have a variety of different formats. For one embodiment, the actionable information may include specific point information utilized to communicate with a specific point. Examples of point information include, and are not limited to, the points BACnet object-type, instance number, and the IP address to the panel that includes the point or points. For another embodiment, the actionable information may include a universal unique identifier (UUID). The UUID may exist alone or in conjunction with the point information, for example, as described above. The UUID may be transmitted to the virtual node hosting environment 402 which determines one or more actions to be perform based on the received information. The UUID approach is particularly advantageous in situations where the point information may change, which would cause one or more changes to the visual code with updated information. The UUID approach may also be used to signal a grouping of points rather than a single point. For read only mode, the resulting point information at a mobile device may be minimalistic, such as the name of a point and its current value. For a UUID approach, a listing or grouping of point information may be provided together, thus allowing a mobile device to provide the status of a room or a system of field devices rather than a single field device.

For read/command mode, the building automation system 100 may include an authentication system that also utilizes the visual codes. For some embodiments, the mobile device may be associated with a user-based visual code associated with a user of the mobile device. For example, the user-based visual code may be a user identification sticker that may be applied to the back of an identification badge. The user-based visual code may be encrypted and include user profile information. For other embodiments, an associated personal identification number (PIN) may also be encrypted and embedded in the data of the visual code. To access the building automation system 100, the mobile device may scan and capture the user-based visual code associated with the user. The mobile device transmits the encrypted information to the virtual node hosting environment 402 in response to scanning and/or capturing the user-based visual code. For yet another embodiment, the virtual node hosting environment 402 may present a user interface querying the user for the associated PIN, if applicable.

For the authentication system that utilizes the visual codes, the implementation of a PIN minimizes any risk for a situation where the user does not maintain control over his or her identification badge. The authentication system that also utilizes the visual codes may compare the submitted user information with a database or another user authentication system to validate the submitted information. Once the mobile device authenticates with the system via the authentication system, the device may be issued a commanding personal identification number ("commanding PIN"). The commanding PIN may be used to issue one or more subsequent commands, such as starting a pump or turning-off a light. The mobile device may scan the visual code associated with the field device to be commanded, and the mobile device may be presented with a confirmation user interface and queried for the commanding PIN. In response to confirming the command intent and providing a valid commanding PIN by the mobile device, the virtual node hosting environment 402 may issue the appropriate command on their behalf. The commanding PIN may be setup for single use, where a user may only command a single field device once, or the commanding PIN may be set for use over a determined period of time or determined number of commands before becoming invalid.

Figure 10:
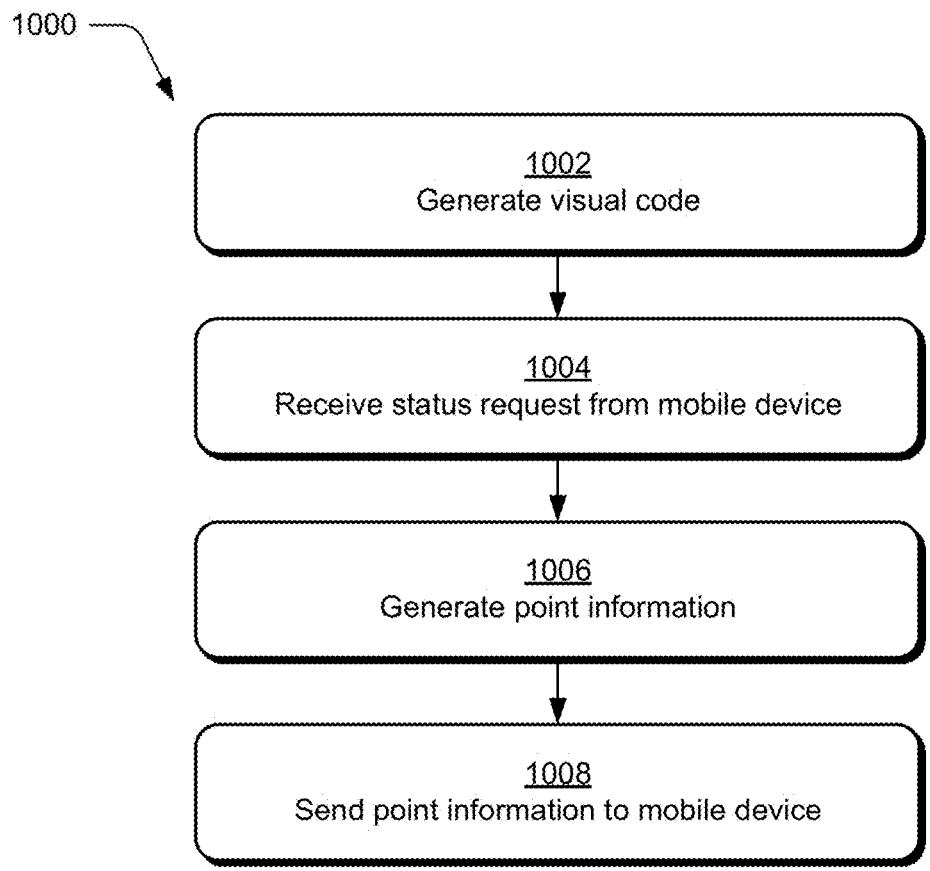
FIG. 10 depicts an example implementation of the procedure for managing field devices in accordance with the techniques described herein.

FIG. 10 represents an example implementation of the procedure 1000 for managing field devices by a building automation system 100. At the building automation system 100, a visual code for a field device of the building is generated at step 1002. The visual code identifies a uniform resource locator that is directed to the virtual node hosting environment 402 of the building automation system 100 associated with the particular field device. For some embodiment, the uniform resource locator identified by the visual code may be unencrypted. For other embodiments, an action portion of the visual code may be generated. The action portion may be encrypted and include actionable information associated with controlling the particular field device. The visual code may be generated based on information collected from scanning the building automation system 100 to discover multiple field devices.

At some time after the visual code or codes are generated, the virtual node hosting environment 402 may receive a status request for a particular field device from a mobile device at step 1004. The status request is associated with the uniform resource locator identified by the visual code. At the virtual node hosting environment 402, point information associated with the particular field device is generated based on information collected in realtime from the particular field device, at step 1006, in response to receiving the status request. For some embodiments, the procedure 1000 may include determining whether the mobile device 126 is authenticated by the building automation system and generating the point information at step 1006 in response to determining that the mobile device is authenticated. The point information associated with the particular field device is sent to the mobile device 126 at step 1008 in response to generating the point information.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A system for configuring field devices of a building comprising:
   a communication component configured to scan the building automation system to discover a plurality of field devices;
   a processor configured to generate a visual code for a particular field device of the plurality of field devices discovered in response to scanning the building automation system, wherein:
      the visual code identifies a uniform resource locator directed to a virtual node hosting environment of the building automation system associated with the particular field device,
      the virtual node hosting environment includes a plurality of virtual nodes associated with the plurality of field devices,
      the plurality of virtual nodes are digital representations of the plurality of field devices, and
      the plurality of virtual nodes include a particular virtual node associated with the particular field device; and
   an output component configured to produce the visual code at a physical material for exhibition in proximity to the particular field device.

2. The system as described in claim 1, wherein the uniform resource locator is unencrypted, and the visual code further includes actionable information associated with controlling the particular field device.

3. The system as described in claim 2, wherein the actionable information includes point data corresponding to the particular field device to enable the virtual node hosting environment of the building automation system to communicate with the particular field device.

4. The system as described in claim 2, wherein the actionable information includes command information corresponding to the particular field device to enable the virtual node hosting environment of the building automation system to cause an action to be performed by the particular field device.

5. The system as described in claim 1, wherein the communication component provides the visual code to an ink-based printer for engaging printable material.

6. A method of a building automation system for configuring field devices of a building, the method comprising:
   scanning the building automation system to discover a plurality of field devices;
   generating a virtual node hosting environment at the building automation system;
   creating a plurality of virtual nodes in the virtual node hosting environment associated with the plurality of field devices, wherein the plurality of virtual nodes are digital representations of the plurality of field devices and the plurality of virtual nodes include a particular virtual node associated with the particular field device;
   generating a visual code for the particular field device of the plurality of field devices discovered in response to scanning the building automation system, wherein the visual code identifies a uniform resource locator that is directed to the virtual node hosting environment of the building automation system associated with the particular field device; and providing the visual code at physical material for exhibition in proximity to the particular field device.

7. The method as described in claim 6, wherein:
the uniform resource locator is unencrypted; and
the visual code includes actionable information that is encrypted and associated with controlling the particular field device.

8. The method as described in claim 7, wherein the actionable information includes point data corresponding to the particular field device to enable the virtual node hosting environment of the building automation system to communicate with the particular field device.

9. The method as described in claim 7, wherein the actionable information includes command information corresponding to the particular field device to enable the virtual node hosting environment of the building automation system to cause an action to be performed by the particular field device.

10. The method as described in claim 6, wherein providing, by the communication component, the visual code to an ink-based printer for engaging printable material.

11. A building automation system for managing field devices of a building comprising:
a processor configured to generate a visual code for a particular field device of a plurality of field devices discovered in response to scanning the building automation system, the visual code identifying a uniform resource locator that is directed to a virtual node hosting environment of the building automation system associated with a particular field device of the plurality of field devices,
wherein the virtual node hosting environment includes a plurality of virtual nodes associated with the plurality of field devices, the plurality of virtual nodes are digital representations of the plurality of field devices, and the plurality of virtual nodes include a particular virtual node associated with the particular field device,
wherein the virtual node hosting environment of the building automation system receives a status request for the particular field device from a mobile device, the status request being associated with the uniform resource locator identified by the visual code,
wherein the virtual node hosting environment further generates point information associated with the particular field device based on information collected from the particular field device in response to receiving the status request;
a communication component configured to send the point information associated with the particular field device to the mobile device.

12. The building automation system as described in claim 11, wherein the uniform resource locator identified by the visual code is unencrypted.

13. The building automation system as described in claim 11, wherein the processor generates an action portion of the visual code, the action portion being encrypted and including actionable information associated with controlling the particular field device.

14. The building automation system as described in claim 11, wherein:
the processor determines whether the mobile device is authenticated by the building automation system; and
the virtual node hosting environment generates the point information in response to determining that the mobile device is authenticated by the building automation system.

15. A method of a building automation system for managing field devices of a building, the method comprising:
generating a virtual node hosting environment at the building automation system;
creating a plurality of virtual nodes in the virtual node hosting environment associated with a plurality of field devices, wherein the plurality of virtual nodes are digital representations of the plurality of field devices and the plurality of virtual nodes include a particular virtual node associated with a particular field device of the plurality of field devices;
generating, at the building automation system, a visual code for the particular field device of the plurality of field devices discovered in response to scanning the building automation system, the visual code identifying a uniform resource locator that is directed to the virtual node hosting environment of the building automation system associated with the particular field device;
receiving, at the virtual node hosting environment, a status request for the particular field device from a mobile device, the status request being associated with the uniform resource locator identified by the visual code;
generating, at the virtual node hosting environment, point information associated with the particular field device based on information collected from the particular field device in response to receiving the status request; and
sending, to the mobile device, the point information associated with the particular field device.

16. The method as described in claim 15, wherein the uniform resource locator identified by the visual code is unencrypted.

17. The method as described in claim 15, wherein generating the visual code comprises:
generating an action portion of the visual code, the action portion being encrypted and including actionable information associated with controlling the particular field device.

18. The method as described in claim 15, further comprising determining whether the mobile device is authenticated by the building automation system,
wherein generating the point information includes generating the point information in response to determining that the mobile device is authenticated by the building automation system.

* * * * *